United States Patent [19]

McWilliams et al.

[11] Patent Number: 4,546,588

[45] Date of Patent: Oct. 15, 1985

[54] SECURING PANELS TO A SUBSTANTIALLY FLAT OR CONVEX SURFACE

[75] Inventors: Joseph A. McWilliams, Droitwich; John T. Hughes, Worcester, both of England

[73] Assignee: Micropore International Limited, Droitwich, England

[21] Appl. No.: 477,029

[22] Filed: Mar. 21, 1983

[30] Foreign Application Priority Data

Mar. 23, 1982 [GB] United Kingdom ................. 8208466

[51] Int. Cl.$^4$ ............................................... E04B 1/38
[52] U.S. Cl. ........................................ 52/506; 52/249; 52/410; 220/1 B
[58] Field of Search ............... 52/410, 506, 509, 245, 52/247, 249, 357, 358, 741, 745; 220/1 B, 5 A; 29/449–452

[56] References Cited

U.S. PATENT DOCUMENTS

| 602,454 | 4/1898 | Kelly | 52/249 |
| 1,558,217 | 10/1925 | Baldwin | 220/1 B |
| 1,860,399 | 5/1932 | Venzie | 52/358 |
| 3,591,876 | 7/1971 | Swindlehurst | 52/410 |

Primary Examiner—James L. Ridgill, Jr.
Attorney, Agent, or Firm—Browdy and Neimark

[57] ABSTRACT

Panels are secured to a substantially flat or convex surface by means of hooks which are attached to the surface at opposite ends of a panel. The hooks are dimensioned so as to terminate at a level beneath the level of the outer surface of the panel and a band of fabric material is positioned on each of the hooks by means of a loop formed substantially at the mid-point of the band, the band also having a loop at each end thereof. The panel is secured to the flat or convex surface by means of springs which are attached to the free ends of the bands and by means of a strap which extends between the springs.

10 Claims, 9 Drawing Figures

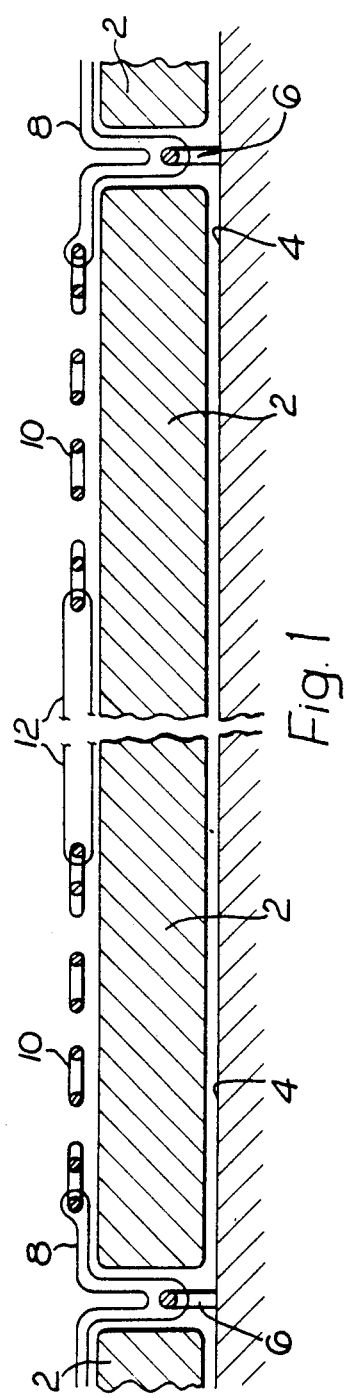
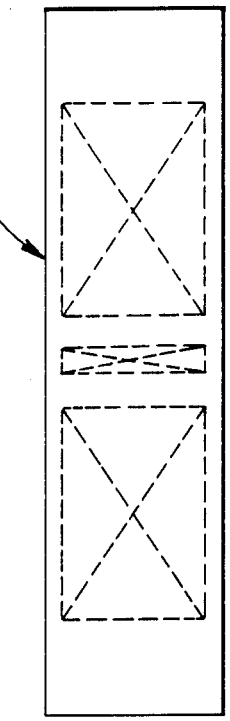
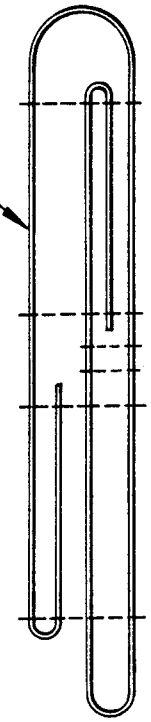
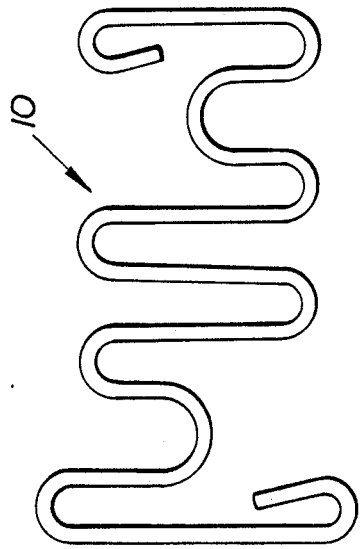

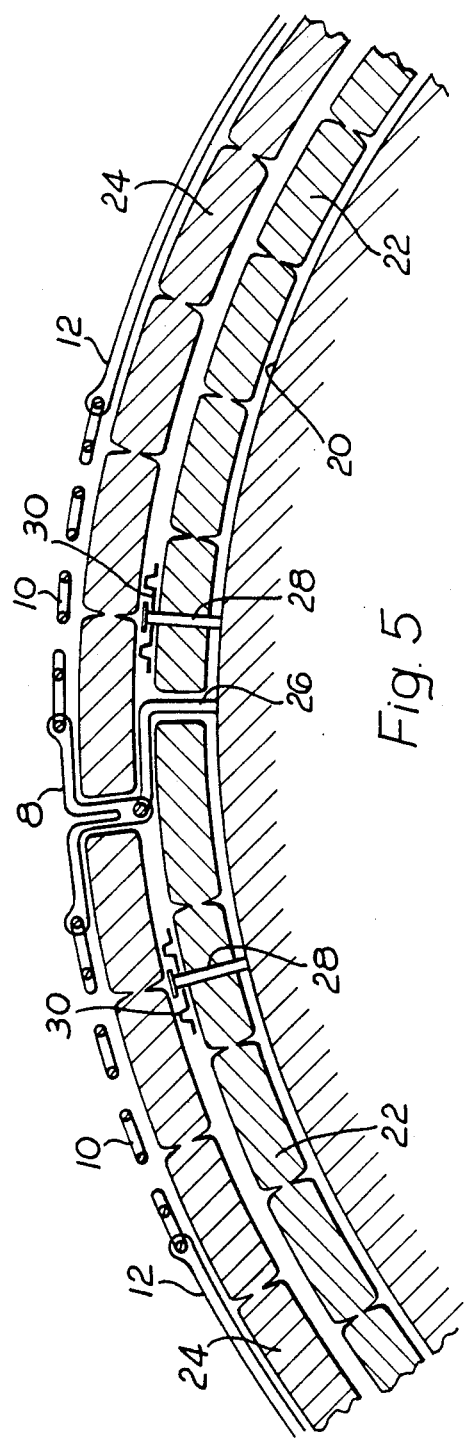
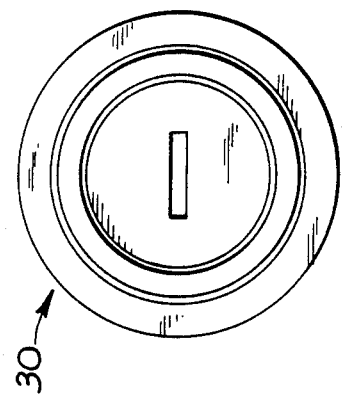
Fig. 9
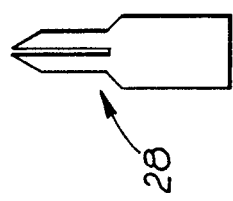
Fig. 8
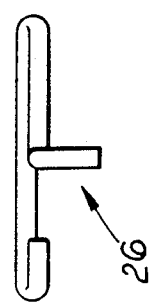
Fig. 7
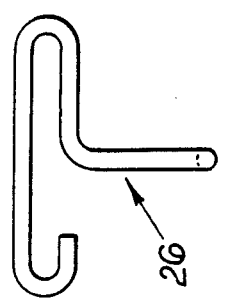
Fig. 6
Fig. 5

SECURING PANELS TO A SUBSTANTIALLY FLAT OR CONVEX SURFACE

BACKGROUND OF THE INVENTION

The present invention relates to a means for and a method of securing panels to a substantially flat or convex surface.

DESCRIPTION OF PRIOR ART

It is known to secure such panels by attaching studs to the surface and positioning the panels against the surface such that the studs extend through apertures in the panels. The protruding ends of the studs are then deformed or provided with suitable means to secure the panels to the surface. Where the surface is at a relatively high temperature and said panels are formed of a thermal insulating material, the method has the disadvantage that the studs provide an opportunity for the direct transfer of heat from the surface to the ambient atmosphere. Such a direct transfer of heat is in certain circumstances unacceptable and can in any event result in hazardous hot spots on the outer surface of the panels.

OBJECT OF THE INVENTION

It is an object of the present invention to provide a means for and a method of securing panels to a substantially flat or convex surface in a manner such that there is no opportunity for direct transfer of heat through the securing means for the panels.

SUMMARY OF THE INVENTION

According to one aspect of the present invention there is provided a means for securing panels to a substantially flat or convex surface, which means comprises:

a pair of hooks for attaching to the surface at opposite ends of a panel, each of which hooks is dimensioned so as to terminate at a level beneath the level of the outer surface of the panel;

a band of fabric material for each of the hooks, each band having a loop at each end thereof and a loop substantially at the mid-point thereof; and spring means extending between the adjacent ends of the bands so as to secure the panel to the flat or convex surface.

In one embodiment of the invention, the spring means comprises a spring mounted in each of the loops at the ends of the bands and a strap of fabric material extending between the springs so as to lie along the outer surface of the panel.

The spring may comprise a length of wire bent into a flat, sinuous shape. The spring may have a loading of substantially 18.14 kg when extended by 20 mm. The hooks may each be provided with a shank which incorporates a right-angle bend so as to enable the shank to pass between adjacent panels of a lower layer of panels and the hook to terminate at a level beneath the level of the outer surface of an upper layer of panels, which upper layer of panels is offset from the lower layer of panels. The shank of each hook is preferably dimensioned such that the panels of the upper layer are offset by substantially 30 mm from the panels of the lower layer. The hook portion of each hook may be inclined relative to the shank adjacent thereto.

According to a second aspect of the present invention there is provided a method of securing panels to a substantially flat or convex surface, which method comprises the steps of:

securing a pair of hooks to the surface so as to be located at opposite ends of a panel, each of which hooks is dimensioned so as to terminate at a level beneath the level of the outer surface of the panel;

positioning the panel between the hooks;

attaching a band of fabric material to each of the hooks by means of a loop provided substantially at the mid-point of the band, the band being provided with a further loop at each end thereof; and positioning spring means so as to extend between the adjacent ends of the bands so as to secure the panel to the flat or convex surface.

The spring means may be in the form of a spring mounted in each of the loops at the ends of the bands and a strap of fabric material extending between the springs so as to lie along the outer surface of the panel.

For a better understanding of the present invention and to show more clearly how it may be carried into effect reference will now be made, by way of example, to the accompanying drawings in which:

BRIEF DESCRIPTION OF THE DRAWINGS

FIG. 1 is a diagrammatic cross-sectional view through a panel secured to a flat surface by one embodiment of a securing means according to the present invention;

FIG. 2 is a plan view of a tensioning spring forming part of the securing means shown in FIG. 1;

FIG. 3 is a plan view of a fabric band forming part of the securing means shown in FIG. 1;

FIG. 4 is a diagrammatic side view illustrating the manner in which the band is assembled;

FIG. 5 is a diagrammatic cross-sectional view through two layers of panels secured to a convex surface by a further embodiment of a securing means according to the present invention;

FIG. 6 is a plan view of an anchor used in the embodiment illustrated in FIG. 5;

FIG. 7 is an elevational view of the anchor shown in FIG. 6;

FIG. 8 shows a stud which may be used for securing the underneath layer of panels in the embodiment shown in FIG. 5; and FIG. 9 shows a washer for retaining the underneath layer of panels in conjunction with the stud shown in FIG. 8.

DESCRIPTION OF PREFERRED EMBODIMENTS

FIG. 1 shows a number of panels 2 of thermal insulating material arranged on a flat surface 4. Arranged between the panels 2 are anchors 6 and attached to each of the anchors 6 is a band 8 of fabric material. Hooked into each end of the bands 8 is a flat spring 10 and the springs 10 are interconnected by means of a strap 12 of fabric material.

The anchors 6 are preferably made of the same material as the surface 4 and may be secured to the surface, for example, by means of welding. In the embodiment shown in FIG. 1, the anchors 6 are in the form of hooks.

The band 8 of fabric material is shown in more detail in FIGS. 3 and 4. As can be seen from FIGS. 3 and 4, a loop is formed in the band at each end thereof and a further loop is formed substantially at the mid-point of the band for engagement with the anchor 6. The band may be assembled by stitching according to the pattern shown in FIGS. 3 and 4. Because the band is in direct contact with the anchor 6, which itself is in direct contact with the surface 4 and therefore is substantially at the same temperature as the surface 4, the material of the band must be such as to retain its tensile strength at the temperature of the surface 4. For relatively low temperature applications, the band may be made of borosilicate glass tape, but at temperatures above about 500° C. borosilicate glass loses its strength and it becomes necessary to use a ceramic fibre tape. We have found an alumina/boria/silica ceramic fibre sold under the trade mark Nextel 312 to be suitable. The thread used for stitching the fabric may also have to be changed at higher temperatures, but we have found that borosilicate glass thread can generally be used at temperatures where the material of the band must be ceramic fibre.

FIG. 2 shows in detail the flat spring 10. The spring 10 is made from, for example, a length of spring steel wire or heat-treated Inconel wire having a nominal diameter of 2.6 mm. The wire is bent into a sinuous shape having a length of 94 mm as shown in the figure and, in a preferred embodiment, has a spring loading of 40 lb (18.14 kg) when extended by 20 mm; permanent deformation does not occur until 25 mm extension has been reached. It will be noted that in FIG. 2, one end of the spring 10 has a greater width than the other end: this is merely to accommodate the ceramic fibre tape which is supplied as a 50 mm wide band, whereas borosilicate glass tape is readily available as a 38 mm wide band and which is used for the straps 12 as will be explained hereinafter.

The free ends of the springs 10 are interconnected by means of a strap 12 which, because it is not subjected directly to the temperature of the surface 4, may be made of borosilicate glass tape. The length of the strap 12 is selected so that the securing means exerts sufficient pressure on the panels 2 to hold the same in place, whilst not causing the springs 10 to exceed their maximum permissible extension as a result of expansion of the surface 4 following heating thereof. The specific length of the straps 12 can readily be determined for each particular application.

FIG. 5 illustrates a further embodiment of a securing means according to the present invention. As will be seen from FIG. 5, the underlying surface 20 is no longer flat, but is convex, and two layers of panels 22, 24 are arranged on the surface 20. As illustrated, where the panels are substantially rigid and/or may be damaged by bending them to conform to the contours of the surface 20, slatted panels may be employed instead of the unitary panels shown in FIG. 1. With two layers of panels, it is highly desirable to offset one layer relative to the other so as to obtain an overlapping of the panels. However, this can cause problems for the securing means, but we have found that a cranked anchor 26 can be employed which extends between adjoining panels of the lower layer, but which then runs a short distance along the upper surface of the lower layer to terminate in a hook which may be located, for example, substantially 30 mm from the edge of a panel of the lower layer.

As with the embodiment shown in FIG. 1, a band 8 of fabric material is attached to the hook of the anchor 26 and a spring 10 is hooked into a loop at each end of the band 8. The springs 10 are interconnected by means of a strap 12 of fabric material. The components of the securing means may be made of the same material as mentioned in respect of the embodiment shown in FIG. 1.

As shown in FIG. 5, it may at times be necessary or desirable to secure the lower layer of panels 22 to the surface 20. However, because any means for securing the panels 22 will not be exposed to the ambient atmosphere, it is acceptable to pass studs 28 through the panels 22 and to secure the panels in place by engaging the studs with washers 30.

FIGS. 6 and 7 illustrate the cranked anchor 26 in more detail. Essentially, the anchor 26 comprises an elongate hook having a shank which incorporates a right angle bend so as to permit a part of the shank to run along the surface of the panels 22 and the remainder of the shank to extend between two adjoining panels to the convex surface 20 to which it is attached. It may be preferable to incline the hook of the anchor away from the layer of panels 22 so as to facilitate the insertion of the hook into the appropriate loop of the band 8.

The stud 28 is shown in more detail in FIG. 8. The stud 28 is made for example of sheet metal, and preferably of the same material as the surface 20 to which it is secured for example by welding. The stud comprises a lower portion which extends through the panel 22 and an upper portion which is divided into two by means of a slit. After the panel 22 has been pushed onto the stud 28, a washer 30 is placed over the upper portion so as to urge against the outer surface of the panel 22 and the upper portion of the stud is then bent over to retain the washer 30 against the surface of the panel 22. The washer 30 is shown in more detail in FIG. 9 and is provided with an upstanding annular portion which ensures that the layer of panels 24 is separated from the stud 28 in order to prevent any abrasion of the panels 24 should there be any relative movement between the two layers, for example as a result of thermal expansion and contraction. Similarly, the spring 10 is designed as a flat spring in order to avoid abrasion of the outer surface of the layer of panels 24.

The panels 2, 22, 24 may be made of any suitable material, but for thermal insulation purposes we have found that MICROTHERM (Registered Trade Mark) is particularly effective and is available both as an integral panel and as a slatted panel.

We claim:

1. In combination with a substantially flat or convex surface and at least one panel to be secured to said surface, an assembly for securing said at least one panel to said surface, the assembly comprising:
    a plurality of hooks secured to the surface and positioned such that one of said hooks is disposed at opposite ends of said at least one panel, each of said hooks being dimensioned such that it does not protrude above the level of the outer surface of said at least one panel;
    a band of fabric material attached to each of said hooks by means of a loop provided substantially at the mid-point of said band, said band further having a loop formed at each end thereof; and
    spring means extending over the outer surface of said at least one panel between the loops at adjacent ends of said bands attached to said hooks at said opposite ends of said at least one panel so as to secure said at least one panel to the flat or convex surface.

2. The combination according to claim 1, wherein the spring means comprises a spring mounted in said loops at the ends of said bands and a strap of fabric material extending between the springs so as to lie along the outer surface of said at least one panel.

3. The combination according to claim 2, wherein the spring comprises a length of wire bent into a flat, sinuous shape.

4. The combination according to claim 3, wherein the spring has a loading of substantially 40 lb when extended by 20 mm.

5. In combination with a substantially flat or convex surface, a lower layer of panels and an upper layer of panels to be secured to said surface, an assembly for securing said panels to said surface, the assembly comprising:

a plurality of hooks secured to the surface and positioned such that one of said hooks is disposed at opposite ends of each of the panels of said lower layer, each of said hooks being provided with a shank which incorporates a right-angle bend such that the shank extends between adjacent panels of the lower layer and along a part of the outer surface of one of said panels of the lower layer, said shank being dimensioned such that a hook portion of said hook is positioned between adjacent panels of the upper layer which overlies the lower layer and said hook does not protrude above the level of the outer surface of said upper layer;

a band of fabric material attached to the hook portion of each of said hooks by means of a loop provided substantially at the mid-point of said band, said band further having a loop formed at each end thereof; and spring means extending over the outer surface of said upper layer between the loops at adjacent ends of said bands attached to said hooks at said opposite ends of said panels of the upper layer so as to secure the panels of both said lower and upper layers to the flat or convex surface.

6. The combination according to claim 5, wherein the shank of each hook is dimensioned such that the panels of the upper layer are offset by substantially 30 mm from the panels of the lower layer.

7. The combination according to claim 5, wherein the hook portion of each hook is inclined relative to the shank adjacent thereto.

8. The combination according to claim 5, wherein the spring means comprises a spring mounted in each of the loops at the ends of the bands and a strap of fabric material extending between the springs so as to lie along the outer surface of each panel.

9. The combination according to claim 8, wherein the spring comprises a length of wire bent into a flat, sinuous shape.

10. The combination according to claim 9, wherein the spring has a loading of substantially 40 lb when extended by 20 mm.

* * * * *